Aug. 1, 1967  HO CHOW  3,333,876
LINKAGE JOINTS
Filed Oct. 4, 1965  4 Sheets-Sheet 1

INVENTOR.
HO CHOW

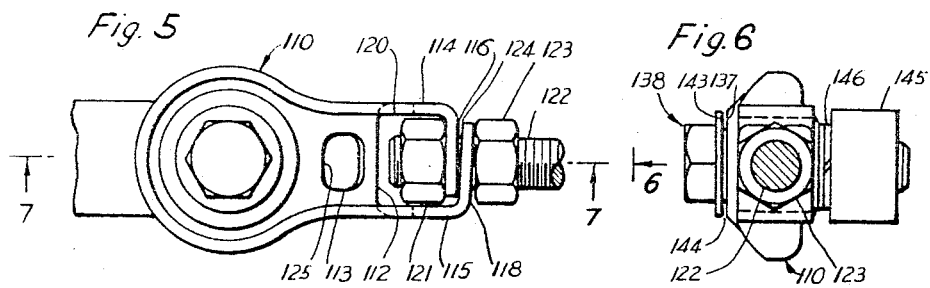
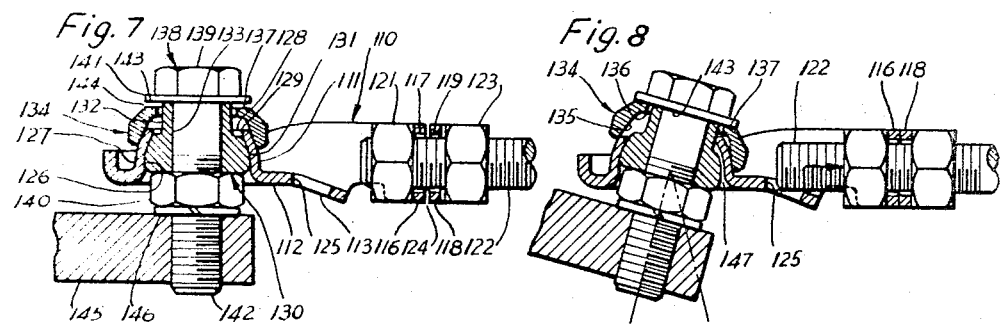
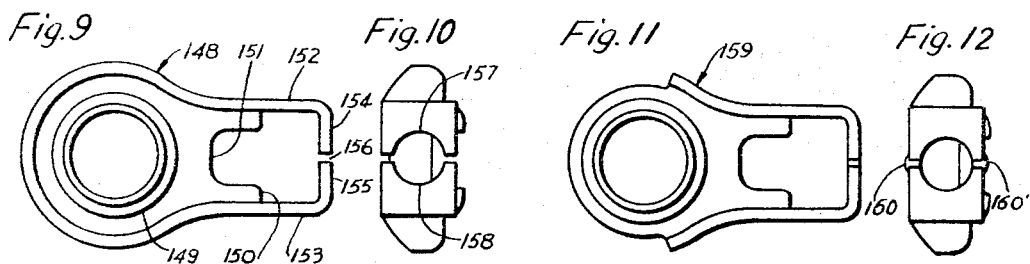
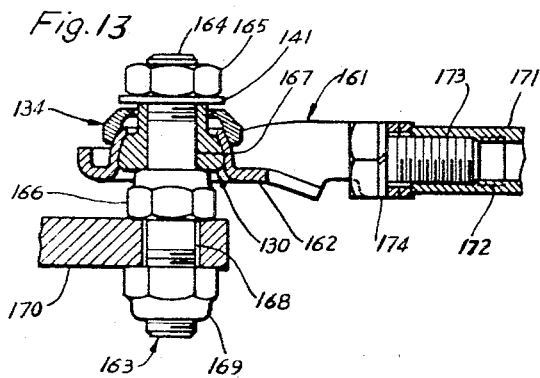

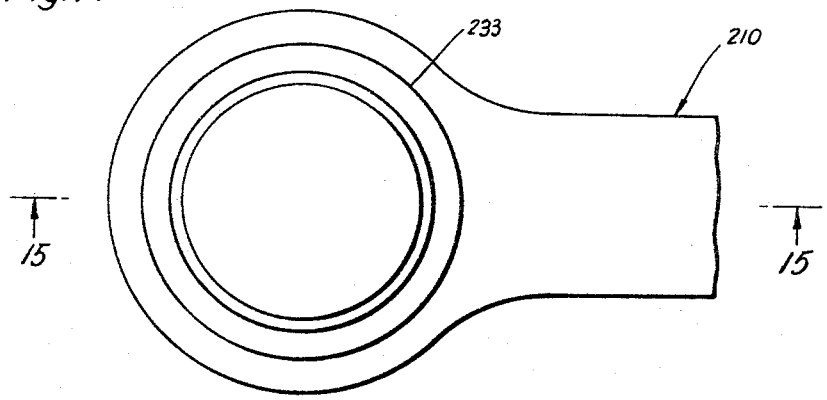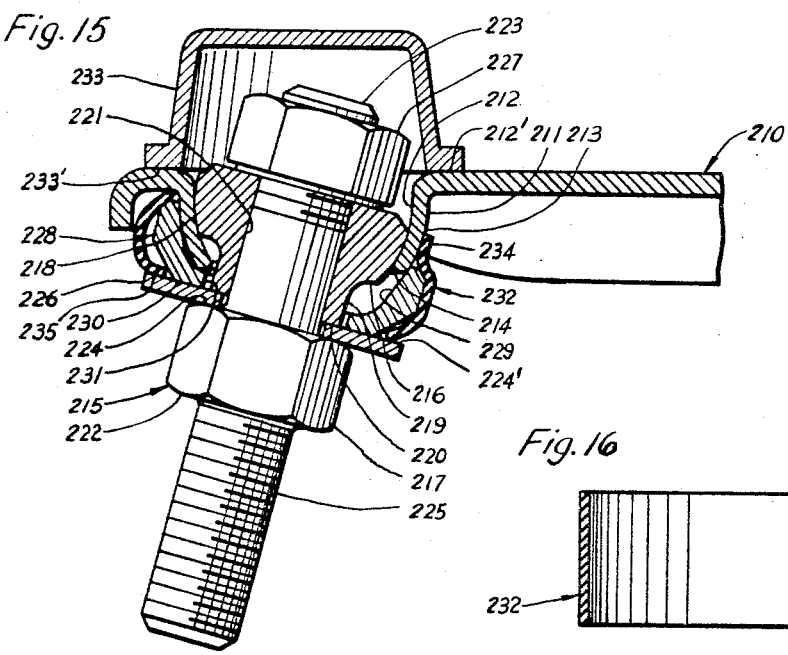

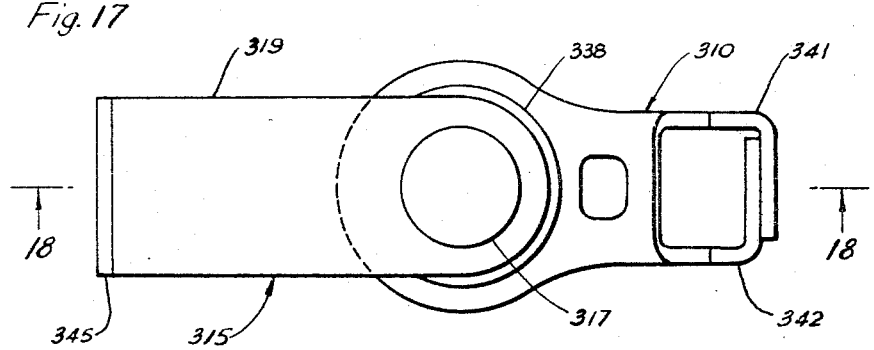
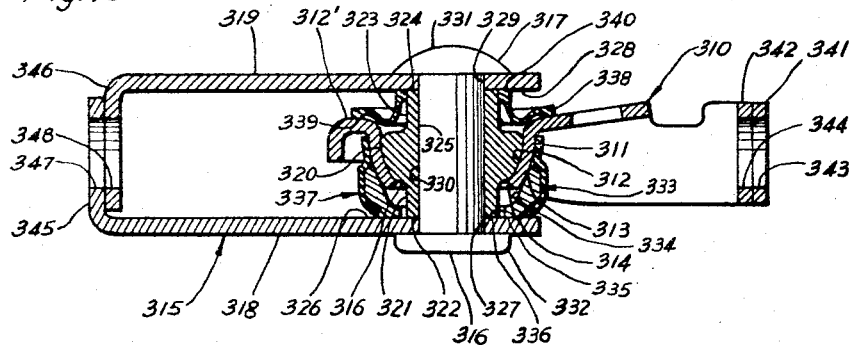

United States Patent Office 3,333,876
Patented Aug. 1, 1967

3,333,876
LINKAGE JOINTS
Ho Chow, River Edge, N.J., assignor to The Heim Universal Corporation, Fairfield, Conn., a corporation of Connecticut
Filed Oct. 4, 1965, Ser. No. 496,247
6 Claims. (Cl. 287—90)

This invention relates to an improved linkage joint to provide a limited tilting movement and a complete rotative movement between two members. The present application is a continuation-in-part of applicant's U.S. patent application 164,817, filed Jan. 8, 1962, entitled, "Linkage Joints," applicant's U.S. patent application 225,-825, filed Sept. 24, 1962, entitled, "Linkage Joints," applicant's U.S. patent application 278,004, filed May 6, 1963, entitled, "Ball Joints," and applicant's U.S. patent application 480,243, filed Aug. 5, 1965, entitled, "Linkage Joints," all of said applications now abandoned.

Linkage joints to join two members provide some degree of tilting and complete rotation of one member relative to another. They are widely used in various machines. It has long been a goal to provide such linkages having relatively low friction and long life at a low cost.

According to this invention, a linkage joint includes a bowl-shaped member having an internal surface, an external surface and an end aperture opposite its open portion. A pin passes freely through the end aperture. In one embodiment the pin has an integral inner head in bearing contact with the internal surface of the hollow ball and a shoulder forming a ledge. In another embodiment a bushing surrounds the shank of the pin and is in bearing contact with the internal surface of the bowl. The bushing rotates freely on the pin member. The bushing is held by the lower head of the pin. The bushing has a tubular upper aperture which protrudes through the bowl-shaped member. In both embodiments the bolt has an outer head spaced with respect to the hollow ball by means of the shoulder on the pin or the shoulder formed by the top of the tubular portion of the bearing. A retainer is positioned so that it has a surface in bearing contact with the external surface of the hollow ball and has a plane bearing surface in contact with the outer head of the pin. The pin passes through a hole in the retainer. There is no limitation in the movement of the pin's outer head along the retainer's plane bearing surface. This assembly permits a limited tilting movement and a complete rotative movement between the bowl-shaped member and pin.

For the purpose of describing the present invention, the term "ball member" means the sheet metal member having the bowl shaped or "hollow ball" portion; "stud member" means the pin's shank, the pin's outer head and the pin's inner head; the "inner head" of the "stud member" means the bushing on the shank in one embodiment or the integral lower portion of the pin's shank in the other embodiment. The term "pin" includes a threaded bolt, rivet body, or other type of coupling member.

Features of this invention include an insert head at the inner head of the stud member having a bearing surface in bearing contact with the internal surface of the hollow ball; that the internal surface of the hollow ball has one of its boundaries at an equatorial circle; a spring between the outer head of the stud member and the retainer; and a dynamic seal forming a completely sealed linkage joint.

It is the objective of the present invention to provide a bearing assembly which is inexpensive in that it is constructed out of sheet metal and easily produced parts and provides limited tilting and complete rotative motion on bearing surfaces.

With the above and other objects in view the invention comprises certain new and useful constructions, combinations and arrangements of parts, clearly described in the following specifications and fully illustrated in the drawings, in which:

FIG. 5 is a plan view of another embodiment of a linkage joint constructed according to this invention;

FIG. 6 is a side view of FIG. 5, looking in the direction of the arrow 6 of FIG. 5;

FIG. 7 is a partial cross-sectional view of FIG. 5, taken on the line 7—7 of FIG. 5, looking in the direction of arrows;

FIG. 8 is the same cross-sectional view as FIG. 7 except in a tilted and loaded condition;

FIG. 9 is a plan view of another modified form of the ball member of the linkage joint constructed according to this invention;

FIG. 10 is a side view of FIG. 9;

FIG. 11 is a plan view of another modified form of the ball member of the linkage joint constructed according to this invention;

FIG. 12 is a side view of FIG. 11;

FIG. 13 is a partial cross-sectional view of a modified form of the linkage joint according to this invention;

FIG. 14 is a plain view of another embodiment of a linkage joint constructed according to this invention;

FIG. 15 is a partial cross-sectional view of FIG. 14, taken on the line 15—15 of FIG. 14, looking in the direction of arrows;

FIG. 16 is a cross-sectional view of the elastic sleeve of FIGS. 14 and 15 before assembling;

FIG. 17 is a plain view of another embodiment of a linkage joint constructed according to this invention; and FIG. 18 is a partial cross-sectional view of FIG. 17, taken on the line 18—18 of FIG. 17, looking in the direction of arrows.

Figure 1:
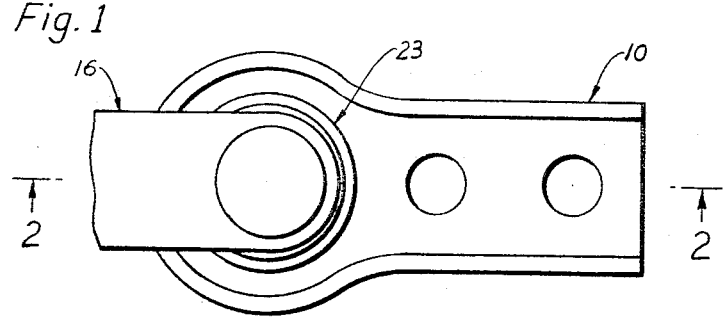
FIG. 1 is a plan view of a linkage joint according to this invention.
Figure 2:
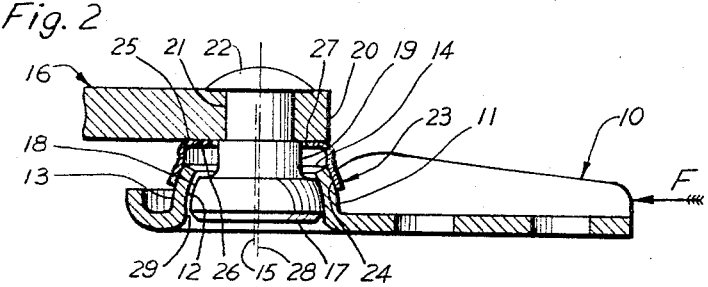
FIG. 2 is a partial cross-sectional view thereof, taken on the line 2—2 of FIG. 1, looking in the direction of arrows.

In the drawing, FIGS. 1 and 2 show a linkage joint constructed with a ball member 10 having a hollow ball 11. The hollow ball is formed to provide an internal segmental sperical bearing surface 12, an external segmental spherical bearing surface 13 and an aperture 14. Surfaces 12 and 13 have their centers as close as possible on a center line 15.

A stud member 16 has an inner head 17 which has an external bearing surface 18 in bearing contact with the internal segmental spherical bearing surface 12 of the hollow ball 11. A shank 19 passes freely through the aperture 14. An outer head 20 on the member 16 is fixed permanently or rigidly on a rivet portion 21 next to the shank 19 and beyond the hollow ball 11 by a head 22 on the rivet portion 21.

A retainer 23 has an internal circumferentially continuous bearing surface 24 in bearing contact with the surface 13 of the ball member 10 and a plane or flat annular bearing surface 25 in bearing contact with a flat surface 26 on the outer head 20. The retainer also has a hole 27 larger in diameter than the shank 19 of the stud member 16.

The stud member 16 has a center line 28 which is displaced from the center line 15 while a radial force, designated by F, is applied, due to a bearing clearance 29 illustrated in an exaggerated manner between the surface 12 of the hollow ball 11 and the surface 18 of the head 17.

The hole 27 in the retainer 23 is made large enough to avoid any physical contact with the shank 19 to allow a free movement of the bearing surface 25 on the surface 26 of the head 20 under the displaced condition between the ball and stud members.

In this construction, the stud member can tilt through a limited range and rotate through a complete circle on the ball member. Depending on frictional condition, the retainer 23 will mostly rotate with the ball member 10 by reason of its engagement with the hollow ball 11.

Figure 3:
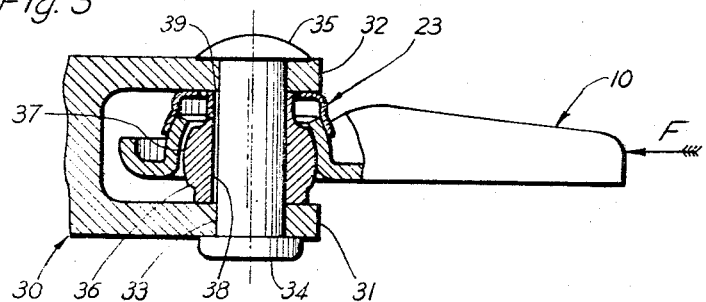
FIG. 3 is a partial cross-sectional view of a modified form of the linkage joint according to this invention.

In FIG. 3, a modified form of this invention is shown, wherein similar parts are modified. The ball member 10 and the retainer 23 are the same as shown in FIG. 2, while the stud member is constructed differently for the same or similar function. The stud member 30 has an inner head 31, an outer head 32 and a pin 33 between the two heads 31 and 32 passing freely through the aperture 14 of the ball member 10 or the hollow ball 11 thereof. The two heads 31 and 32 are integrally joined, as illustrated. However, these two heads could be separated, due to the presence of heads 34 and 35 on the pin 33. An insert head 36 constitutes part of the head portion of the stud member and is mounted on the pin 33. The head 36 has an external bearing surface 37 in bearing contact with the internal segmental spherical bearing surface of the hollow ball 11 of the ball member 10 with an exaggerated bearing clearance under the radial load F and a hole 38 which could engage securely to the pin 33 of the stud member 30.

However, in the construction shown in FIG. 3, the head 36 serves as a bushing which will rotate freely on the stud member 30 against the pin 33 and the inner head 31 with an exaggerated bearing clearance 39 under the radial load F.

It will also appear from a consideration of FIG. 3 that the annular flat surface of the retainer 23 engages a flat surface of the head 32 of the stud member 30. In other words, the retainer 23 of FIG. 3 operates in the same manner as the retainer 23 of FIG. 2.

Figure 4:
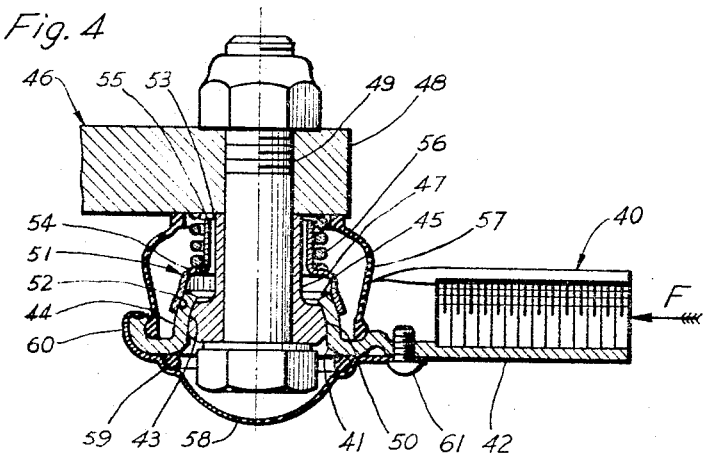
FIG. 4 is a partial cross-sectional view of another modified form of the present invention of linkage joints.

FIG. 4 shows another modified form of the invention. In this figure, a ball member 40 has a hollow ball 41 and an end 42 with internal thread. The hollow ball 41 has an internal segmental spherical bearing surface 43 and an external segmental spherical bearing surface 44, as well as a central aperture 45. A stud member 46 has an insert head 47, an outer head 48 and a bolt 49. The bolt 49 holds the head 47 and the outer head 48 together with part of 47 arranged in the aperture 45 of the ball member 40. The head 47 has an external bearing surface 50 in bearing contact with the surface 43 of the ball member 40. A retainer 51 extends between the hollow ball 41 and the outer head 48 and has an internal bearing surface 52 in bearing contact with the surface 44. The retainer 51 also has a hole 53 and a shoulder 54. The hole 53 is large enough to avoid any physical contact with any adjacent portion of the head 47, except in having a bearing contact with the outer head 48. The retainer 51 also has an end 55, which will limit the axial movement in the direction of the bolt axis between the ball and stud members and will serve as a bearing surface of the plane type against the outer head 48 with a free movement along the plane bearing surface of the head. The gap between the end 55 and the outer head 48 is exaggerated for illustration purposes. A compression spring 56 is provided between the shoulder 54 of the retainer 51 and the outer head 48, while permitting a free rotation between the retainer 51 and the outer head 48.

When a radial force F is applied between the ball and stud members, an axial force, in the axial direction of the bolt will tend to move the ball member towards the outer head. If this axial force is smaller than the preloaded force of the spring 56, there will be no radial movement between the ball and stud members. When the axial force exceeds the preloaded spring force, the ball member will move towards the outer head of the stud member until the end of the retainer 51 in contact with the outer head 48 (or the spring becomes solid) and a limited bearing clearance will be formed between the internal segmental spherical bearing surface 43 of the ball member 40 and the external bearing surface 50 of the head 47 as a part of the stud member.

A dynamic seal 57 of the bellow type is engaged between the stud and ball members and a cover 58 with a seal member 59 is secured to the ball member to cover the inner head of the stud member by means of prongs 60 and a screw 61.

If the stud member is connected at the inner head side, then the dynamic seal and the cover will be reversed accordingly. If the stud member is connected at both the inner and the outer heads, then two dynamic seals must be provided in order to seal all bearing surfaces.

In the drawings, FIGS. 5, 6, 7 and 8 show a linkage joint constructed with a ball member 110 having a hollow ball 111, a web 112 with a hole 113 and two flanges 114 and 115. The flange 114 has a leg 116 which has an end hole 117 and the other flange 115 has a leg 118 which has an end hole 119 approximately in line with the end hole 117. The center line of these end holes 117 and 119 is at almost 90 degrees to the center line of the hollow ball and passes near the center of the hollow ball 111 as normally required in many cases. The web 112, the flanges 114 and 115 and the legs 116 and 118 form an opening 120 which can receive a fastening member such as a nut 121. A threaded link 122 having a nut 123 passes the end holes 117 and 119 freely and is engaged with the nut 121. Before the nuts are tightened on the threaded rod 122 against the legs 116 and 118, there will be a slight gap 124 between the two legs 116 and 118 in order to facilitate manufacturing as shown in FIGS. 5 and 7. Upon tightening, this gap 124 will be disappeared as shown in FIG. 8. This gap 124 can practically be reduced to zero in production, if necessary. The threaded rod 122 can be turned in or out as shown in FIGS. 7 and 8 for the length adjustment as required in many practical applications. The hole 113 is provided for avoiding any interference with the threaded rod 122 and a stop 125, for preventing the threaded rod to move too much inward to interfere with the moving elements of the linkage joint.

For some usages, as shown in these figures, the flanges 114 and 115 have a width just equal or less than the hexagon width of the nut 121 in order that the nut might be held with a wrench for tightening purposes. Besides, the width of the opening 120 between the flanges 114 and 115 is slightly wider than the corner width of the hexagon of the nut 121, so that the nut 121 can be rotated freely on the threaded rod 122 for the engagement and length adjustment.

In some usages, the opening 120 between the flanges 114 and 115 is slightly larger than the hexagon width of the nut 121 but smaller than the corner width of the hexagon of the nut 121 so that the threaded rod 122 can be turned without holding a wrench on the nut 121.

The hollow ball 111 is formed to provide an internal segmental spherical bearing surface 126, an external segmental spherical bearing surface 127 and an aperture 128. It is desirable to have one of the boundaries of the internal segmental spherical bearing surface terminated at an equatorial circle of the surface. The aperture 128 has a conical wall 129 which is desirable for serving as a stop as to be explained in a later part. The surfaces 126 and 127 have a common center as close as possible in production which is called the center of the hollow ball.

A bushing 130 has a ball portion 131 in bearing contact with the internal segmental spherical bearing surface 126 of the hollow ball 111, a sleeve portion 132 passing through the aperture 128 of the hollow ball 111 and a center hole 133 through both ball and sleeve portions 131 and 132.

A retainer 134 has an internal bearing surface shown in a conical shape 35 in FIG. 7 or 8 (or a segmental spherical bearing surface as shown in FIG. 13) in bearing contact with the external segmental spherical bearing surface 127, an aperture 136 which will not be in contact with the sleeve portion 132 of the bushing 130 under any condition and an annular flat bearing surface 137.

A stud member 138 consists of a screw 139, a nut 140 and a washer 141. A threaded shank 142 of the screw 139 passes the washer 141 and the center hole 133 of the bushing 130, and the bushing 130 and the washer 141 are clamped tightly between the head of the screw 139 and the nut 140 upon the tightening of the nut on the threaded shank 142. The screw and the nut location can be reversed to perform exactly the same function. A surface 143 of the washer 141 is slightly spaced from or in bearing contact with the flat bearing surface 137 of the retainer 134. This washer can be eliminated, if the head of the screw 139 or the nut 140 is large enough to provide a bearing surface. Other fastening devices, such as rivets and eyelets can be provided instead of the screw and the nut.

There is a clearance 144 between the surfaces 143 and 137. This clearance 144 can be varied considerably, if the bushing 130 and the retainer 134 are made with a wide tolerance in order to achieve a low cost. In order to maintain the quality of the linkage joint, this clearance 144 must be held to a minimum. The sleeve portion 132 of the bushing 130 is capable of being shortened upon the turning of the nut 140 on the threaded shank 142 of the screw 139, while the size of the ball portion 131 of the bushing is almost not affected due to this adjustment of the bearing clearance. Therefore, it is so important to have the whole shape of the bushing 130 properly engineered and made. It has been found that sintered bearing materials (by powder metallurgy) and plastics such as nylon and Delrin are capable of being shortened a considerable amount by compression of the sleeve portion of the bushing without cracking or bursting. Delrin as mentioned above is the registered Du Pont trade name for acetal resins.

After the adjustment of the clearance 144, it is desirable to have the nut 140 locked on the threaded shank 142 of the screw 139 by any mechanical means or a liquid sealant such as Loctite which is a trade name of the American Sealant Company to avoid any accidental change of this desirable clearance.

Under the most severe mounting of this linkage, the threaded shank 142 of the screw 139 is further mounted in an arm 145 with a lockwasher 146 by turning the head of the screw 139. The locking action between the screw 139 and the nut 140 should be so strong that the tightening and loosening of the screw 139 in the arm 145 with the lockwasher 146 shall not affect the preset clearance 144.

Under the extreme tilting condition as shown in FIG. 8, the conical surface 129 of the hollow ball 111 will be in contact with the sleeve portion 132 of the bushing 130 to serve as an internal positive stop for the tilting movement.

Under an external load as shown by the arrow on the link 122 in FIG. 8, the hollow ball 111 of the ball member 110 is shifted on the bushing 130 towards the retainer 134 to form a clearance 147, shown in an exaggerated manner, and the clearance 144 has disappeared by bearing the retainer 134 on the washer 141.

In this construction, the stud member can tilt through a limited range and rotate through a complete circle or any part of it on the ball member. Under working condition as shown in FIG. 8, the frictional force between the ball member and the retainer is normally higher than that between the retainer and the stud member, therefore the retainer 134 will rotate with the ball member 110 except to accommodate the tilting motion between them. Therefore, in this construction, a large bearing surface between the retainer and the hollow ball is not required due to their low rubbing velocity.

FIGS. 9 and 10 show a modified ball member 148 of a linkage joint having a hollow ball 149 as described above, a web 150 with a stop 151 and two flanges 152 and 153. Each flange has a leg 154 and 155 which are separated slightly with a gap 156. Each leg has a notch 157 and 158 which forms a hole to receive a link member.

FIGS. 11 and 12 show another modified ball member 159 of a linkage joint which is similar to that as shown in FIGS. 9 and 10 except a part of the flange near the hollow ball is removed and the gap between these two legs is filled with welding material 160 and 160' for additional strength to prevent the legs from separation.

In FIG. 13, a modified form of this invention is shown, wherein similar parts are modified. The ball member 161 is the same as shown in FIGS. 5, 6 and 7, except the web 162 having the shape as shown in FIG. 9. The bushing 130 and the retainer 134 are the same as shown in FIG. 6 except the shape of the internal bearing surface of the retainer 134, while the stud member is constructed differently for the same or similar function.

The stud member 163 includes a stud 164, a nut 165 and a washer 141. The stud 164 has an integral hexagon portion 166 and a threaded shank 167 which engages with the nut 165 to perform the same function as shown in FIG. 7 and the threaded shank 168 engages with another nut 169 for mounting to an arm 170.

The ball member 161 is connected with a connecting link 171 which has a tapped hole 172. A screw 173 with a lockwasher 174 is placed in the end holes and engages tightly with the connecting link 171. In this construction, the connecting link can be in any shape, such as a flat plate or any part of a structure.

The embodiment of FIGS. 14 and 15, which is similar to the other embodiments in some respects, is a ball joint construction with a ball member 210 having a hollow ball 211. The hollow ball is formed to provide an internal segmental spherical bearing surface 212, an external segmental spherical bearing surface 213, an end hole 214 and an annular surface 212' adjacent to the surface 212. Surfaces 212 and 213 have their centers as close as possible.

An element 215 consists of a bushing 216 and a holder 217. The bushing has a surface 218 in contact with the internal bearing surface 212 of the hollow ball 211, a sleeve portion 219 which passes loosely through the end hole 214, an end surface 220 and a hole 221. The holder 217 has a hexagon body 222, a threaded shank 223 at one end, a shoulder 224 on the hexagon body 222 and a threaded rod 225 at the other end. The threaded shank 223 fits in the hole 221 of the bushing 216. The threaded rod 225 is provided for further connection of the element and can be made in any shape.

A washer 226 is provided on the shoulder 224 to provide a flat surface 224', when the shoulder 224 is not large enough or is a poor material for serving as a bearing. The holder 217 also has a nut 227.

By engaging and tightening the nut 227 on the threaded shank 223, the flat surface 224' is engaged with the end surface 220 of the bushing 216. The bushing 216, the holder 217 and the washer 226 become the integral element 215. Any fastening means can be provided to form the holder 217.

A retainer 228 has an internal surface 229 in bearing contact with the external surface 213 of the hollow ball 211, a plane bearing surface 230 in bearing contact with the flat surface 224' and an aperture 231 which will not touch the sleeve portion 219 of the bushing 216. The internal surface 229 can be in a conical shape as shown in FIG. 15.

An elastic sleeve 232 and a cover 233 are further provided. The elastic sleeve 232 is provided for sealing bearing surfaces and/or preventing vibration noises. This elastic sleeve is preferred in a hollow cylindrical shape before assembling, as shown in FIG. 16, and is stretched and wrapped over the retainer 228. One end 234 of the elastic sleeve 232 is stretched and engaged with the external surface 213 of the hollow ball 211 and the other end 235 tensionally engages the flat surface 224'. This elastic sleeve 232 will allow the free relative movements of the ball member 210, the element 215 and the retainer 228 one with respect to the other.

In order to form a completely sealed ball joint and to provide an ample space for reserving a lubricant to reach the bearing surfaces, the cover 233 is provided. The cover 233 has a surface 233' welded, bonded or otherwise fixed to the surface 212' of the ball member 210.

The cover 233 can be provided with a grease fitting (not shown) for injecting a lubricant therein. This cover also can be made from a material which can receive a needle for injecting a lubricant and will close the aperture by itself upon the withdrawal of the needle.

In this construction, the element 215 can tilt through a limited range and rotate through a complete circle or any part of it in the ball member 210 and the retainer has a free floating movement.

In FIGS. 17 and 18, another embodiment of this invention is shown, wherein similar parts are modified for achieving the similar purposes.

A ball member 310 has a hollow ball 311, which is formed to provide an internal segmental spherical bearing surface 312, an external segmental spherical bearing surface 313, an end hole 314 and a surface 312' adjacent to the surface 312.

An element 315 consists of a bushing 316 and a holder 316'. The holder 316' has a rivet or stud 317 and two bar members 318 and 319 which can be an integral part. The bushing 316 has a surface 320 in contact with the internal surface 312 of the hollow ball 311, a sleeve portion 321 at one side, which passes loosely through the end hole 314, and end surface 322, an extension 323 at the other side, another end surface 324 and a hole 325. The bar member 318 is engaged with the end surface 322 and has a flat surface 326 and a hole 327. The other bar member 319 is engaged with the other end surface 324 and has a surface 328 and a hole 329. The rivet 317 has a shank 330, which fits the holes 325, 327 and 329, and a head 331 which is engaged with the bar member 319. By staking the end of the shank 330 against the bar member 319 to form a head 332 as shown in FIG. 17, the bushing 316 and the holder 316' become the integral element 315. Many means can be provided to form the holder 316'. The rivet and two bar members can be fastened together to provide a free rotation of the bushing on the rivet as a bearing surface.

A retainer 333 has an internal surface 334 in bearing contact with the external surface 313 of the hollow ball 311, a plane bearing surface 335, which is in bearing contact with the flat surface 326 of the bar member 318, and an aperture 336, which will not touch the sleeve portion 321 of the bushing 316. The internal surface 334 can be in a conical shape.

An elastic sleeve 337 generally similar to the sleeve 332 is provided for sealing of bearing surfaces and/or preventing vibration noises. This elastic sleeve is preferred in a hollow cylindrical shape before assembling and is stretched and wrapped over the retainer 333 and the hollow ball 311.

In order to form a completely sealed ball joint in addition to provide a space for reserving a lubricant and/or to prevent vibration noises, a bellow or cover 338 of an elastic material is provided and has a surface 339 in contact with the surface 312' of the ball member 310 and a ring 340 fitted on the extension 323 and in contact with the surface 328 of the element. This bellow is shaped and compressed to engage the respective surfaces and to allow the relative movements between the ball member and the element.

The rest portions of the ball member 310 and the element 315 can be made in any shape to suit any particular requirements. FIGS. 17 and 18 show the ball member 310 having two legs 341 and 342 with holes 343 and 344 respectively, which are in line. The bar members 318 and 319 have bent legs 345 and 346 respectively with holes 347 and 348 in line after assembling. Any further connections can be made to these holes 343, 344, 347 and 348 at both ends of the ball joint.

In this construction, the element 315 can tilt through a limited range and rotate through a complete circle or any part of it in the ball member 310 and the retainer 333 has a free floating movement.

From the above description and the showing of the drawing, my invention related to linkage joints provides a limited tilt and a rotation in a complete circle of 360 degrees or any part of it.

It will be understood, of course, that various details of construction may be varied through a wide range without departing from the principles of this invention and it is, therefore, not the purpose to limit the patent granted herein otherwise than necessitated by the scope of the appended claims.

I claim:

1. A linkage joint for tilting and rotation comprising: a linkage member including a bowl-shaped portion with a hole in the bottom of the bowl, the bowl-shaped portion having interior and exterior segmental spherical bearing surfaces, the bowl-shaped portion being open opposite the hole at its bottom, an annular retainer having a continuous interior bearing surface in slidable contact with the exterior bearing surface of the bowl-shaped portion of the linkage member and having an exterior flat end bearing surface, a stud member including an upper head having a bottom bearing surface adjacent to but spaced from the flat end bearing surface of the retainer and a shank attached to the head and extending through the holes in the retainer and the bowl-shaped portion, a bushing surrounding the shank and having a narrow, cylindrical upper sleeve portion extending through the holes in the retainer and the bowl-shaped portion adjacent to the upper head, said upper sleeve portion having an upper end which bears against said bottom bearing surface for regulating the space between said upper head and said retainer exterior flat end bearing surface, the bushing having an exterior segmental spherical bearing surface on its lower end which bears against the interior bearing surface of the bowl-shaped portion, and a lower head movably secured on the shank and bearing on the lower end of said bushing, the space between said upper head and said flat end bearing surface of said retainer being capable of being reduced by axial movement of said lower head relative to said upper head.

2. A linkage joint as claimed in claim 1, further comprising means for rendering said upper head movable laterally with respect to the retainer.

3. A linkage joint as claimed in claim 1, in which the bushing is capable of being shortened a selected amount by the force exerted on its end.

4. A linkage joint as set forth in claim 1, wherein the interior surface of the retainer is of conical shape.

5. A linkage joint as defined in claim 1 wherein the bowl-shaped portion of the linkage member is a portion of a web formed from a single blank of sheet metal and having two integral flanges having bent legs which overlap and have end holes in line.

6. A linkage joint as defined in claim 1, wherein the internal bearing surface of the bowl-shaped portion of the linkage member has one of its boundaries at an equatorial circle.

References Cited

FOREIGN PATENTS 876,937 5/1953 Germany.
338,359 6/1959 Switzerland.

CARL W. TOMLIN, *Primary Examiner.*

A. V. KUNDRAT, *Assistant Examiner.*